United States Patent [19]
Gadelle et al.

[11] Patent Number: 5,201,612
[45] Date of Patent: Apr. 13, 1993

[54] PROCESS FOR THE CONSOLIDATION OF A GEOLOGICAL FORMATION BY A SUBSTANCE POLYMERIZABLE AT THE TEMPERATURE AND PRESSURE OF THE FORMATION

[75] Inventors: Claude Gadelle, Rueil Malmaison; Jean Lesage, Maurepas Elancourt, both of France

[73] Assignee: Institut Francais du Petrole, Rueil Malmaison Cedex, France

[21] Appl. No.: 948,625

[22] Filed: Sep. 23, 1992

Related U.S. Application Data

[63] Continuation of Ser. No. 718,138, Jun. 20, 1991, abandoned.

[30] Foreign Application Priority Data

Jun. 21, 1990 [FR] France ................. 90 07916

[51] Int. Cl.$^5$ ............................................... E02D 3/12
[52] U.S. Cl. ..................................... 405/264; 405/263; 166/295
[58] Field of Search ................ 405/263, 264, 266, 267, 405/270; 166/295, 288

[56] References Cited

U.S. PATENT DOCUMENTS

| | | | |
|---|---|---|---|
| 3,208,226 | 9/1965 | Falvey | 405/264 |
| 3,373,812 | 3/1968 | Smith | 166/295 X |
| 3,373,813 | 3/1968 | Jennings et al. | 166/295 X |
| 4,370,078 | 1/1983 | Gadelle et al. | 405/264 |
| 4,685,836 | 8/1987 | Burger et al. | 405/263 X |
| 4,800,960 | 1/1989 | Friedman et al. | 166/276 |
| 4,830,108 | 5/1989 | Hazlett et al. | 166/295 X |
| 4,842,072 | 6/1989 | Friedman et al. | 166/295 |
| 4,859,717 | 8/1989 | Hoskin et al. | 166/295 X |
| 4,896,723 | 1/1990 | Hoskin | 166/295 X |
| 4,903,770 | 2/1990 | Friedman et al. | 166/288 |
| 4,917,185 | 4/1990 | Jennings, Jr. et al. | 166/295 X |
| 4,936,385 | 6/1990 | Weaver et al. | 166/288 |
| 4,938,287 | 7/1990 | Friedman et al. | 166/288 |
| 4,940,090 | 7/1990 | Hoskin et al. | 166/295 X |
| 4,964,463 | 10/1990 | Shu | 166/295 X |
| 4,964,465 | 10/1990 | Surles | 405/267 X |
| 5,005,648 | 4/1991 | Friedman et al. | 166/295 |

FOREIGN PATENT DOCUMENTS 403811 3/1974 U.S.S.R. ................. 405/264

OTHER PUBLICATIONS

Advertisement, SandBan Sand Control System, Texaco, 9 pages.
Fader et al., "New Low-Cost Resin System for Sand and Water Control," SPE 24051, Society of Petroleum Engineers, pp. 259-264.

*Primary Examiner*—Dennis L. Taylor
*Assistant Examiner*—Arlen L. Olsen
*Attorney, Agent, or Firm*—Millen, White, Zelano & Branigan

[57] ABSTRACT

The invention relates to a process making it possible to consolidate a geological formation without significantly reducing its permeabiity. A liquid mixture (5) is injected into the formation (1) traversed by a well (2) and then at least one gas is injected through the formation under appropriate conditions. More specifically, the liquid mixture contains a polymerizable substance, preferably a melamine-formaldehyde resin, and at least one catalyst having a Lewis acid character and it substantially polymerizes at the temperature and pressure of the formation, while bonding the unconsolidated elements. Application to the consolidation of a geological formation containing sand.

16 Claims, 1 Drawing Sheet

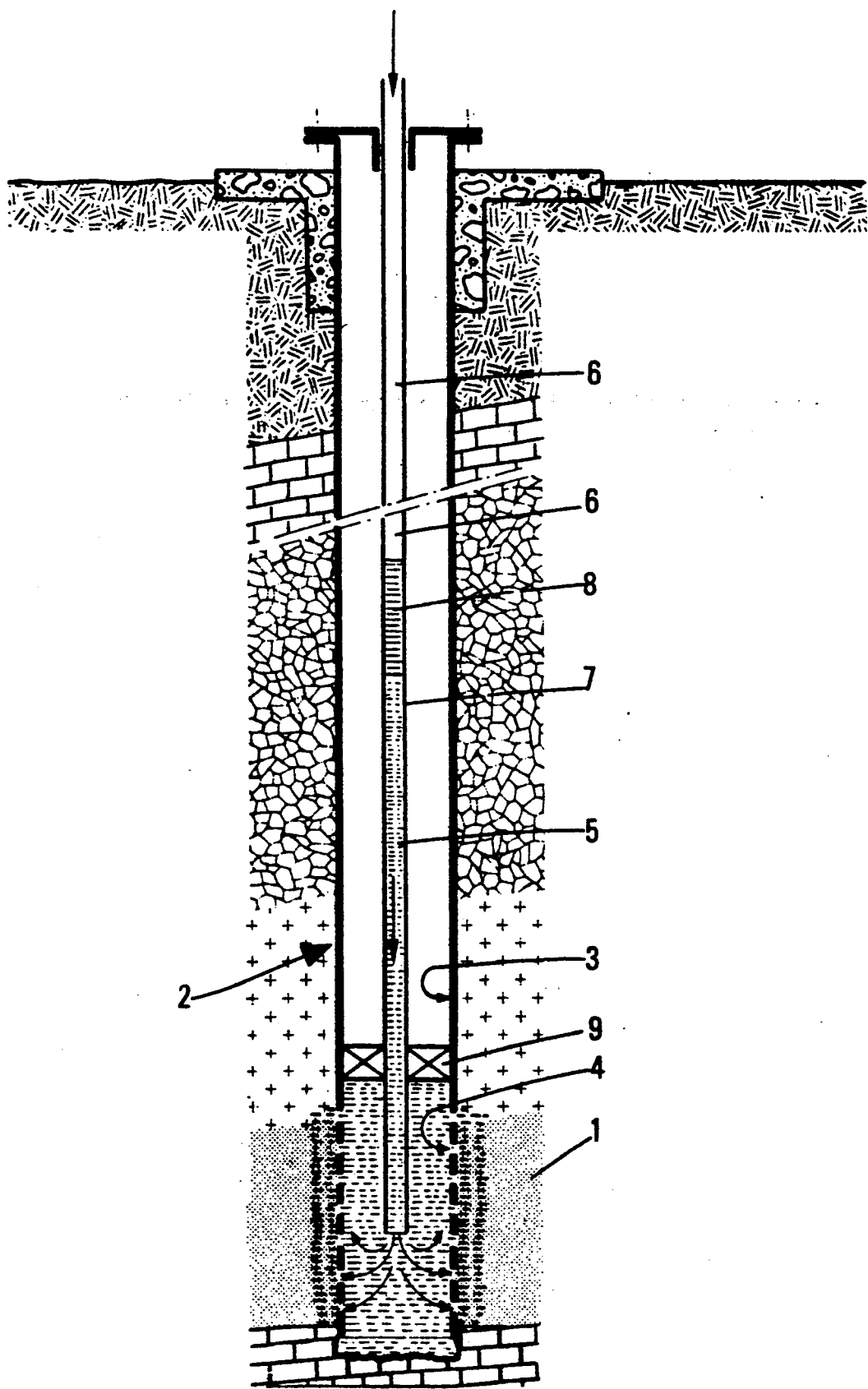

PROCESS FOR THE CONSOLIDATION OF A GEOLOGICAL FORMATION BY A SUBSTANCE POLYMERIZABLE AT THE TEMPERATURE AND PRESSURE OF THE FORMATION

This application is a continuation, of application Ser. No. 07/718,138, filed Jun. 20, 1991, now abandoned.

BACKGROUND OF THE INVENTION

The present invention relates to a process for the consolidation of geological formations, said process being in particular applicable to reservoirs containing oil or gas, in order to eliminate inrushes of sand into wells traversing little or unconsolidated sandy formations. In more general terms, this process can be used for locally consolidating permeable formations.

The prior art is illustrated by U.S. Pat. No. 3,208,226 describing a ureaformaldehyde system for stabilizing soil and making the latter impermeable to water.

Various methods have already been proposed for preventing inrushes of sand into new wells or for treating wells giving rise to inrushes of sand, during the working of oil or gas deposits.

One method consists of injecting into the geological formation a liquid resin which, on polymerizing, creates a bond between the sand grains. A chemical method of this type has an arbitrary efficiency, because the injected resin polymerization reaction is essentially dependent on the conditions prevailing in the well at the said formation and the characteristics of the latter. Consequently such a method does not make it possible to check the degree of advance of the chemical reaction. There is consequently either a risk of an inadequate consolidation of the formation if the degree of polymerization of the resin is inadequate, or a risk of an excessive reduction of the permeability or even a complete clogging or blocking of the geological formation if an excessive polymer quantity is retained in certain pores.

In order to obviate this problem, French Patent 2 474 558, corresponding to U.S. Pat. No. 4,370,078, describes a process in which the polymerization reaction takes place between a liquid chemical agent containing appropriate catalysts put into place around the well to be treated and an injected oxidizing gas.

The circulation of gas following the putting into place of the polymerizable agent ensures that the permeability is maintained. The liquid organic mixture contains a polyethylene compound and a catalyst, so that oxidizing polymerization reactions lead to the consolidation of the medium without it being proved necessary to preheat the formation. However, this process requires the use of an oxygen-inert gas mixture, not necessarily always available. Moreover, the oxidizing gas quantity must be limited so that, as a result of the heat given off by the oxidation reaction, the temperature does not reach values above 350° C., where the polymerized product would be subject to deterioration by combustion.

French Patent 2 575 500, corresponding to U.S. Pat. No. 4,685,836, describes a process in which the polymerization reaction of a liquid chemical agent containing appropriate catalysts and put into place around the well to be treated occurs under the action of a chemically inert, hot gaseous mixture. The circulation of gas following the putting into place of the polymerizable agent also maintains the permeability. However, this process requires the injection of a gaseous mixture having a temperature between 150° and 325° C., i.e. a value well above the temperatures generally encountered in reservoirs containing oil or gas.

SUMMARY OF THE INVENTION

Therefore the object of the present invention is to propose a process which can be used more flexibly to carry out the consolidation of a geological formation without significantly reducing its permeability. This method, applicable to formations having thermal characteristics which can vary significantly, is particularly suitable for the treatment of gas or oil wells giving rise to inrushes of sand.

According to the invention this result is achieved by a process permitting the consolidation of a geological formation without significantly reducing permeability, due to the deterioration of a polymerizable substance, said process comprising the injection of a liquid mixture into the formation, then the injection of a gaseous mixture through the said liquid mixture and being characterized in that the said liquid mixture contains a polymerizable substance to which has been added at least one Lewistype acid catalyst and in that the liquid mixture is transformed, by a polymerization reaction substantially taking place at the temperature and pressure of the formation, into a substance bonding the unconsolidated elements of the formation.

According to a feature of the process, the gas or gaseous mixture is generally chemically inert at the temperature and pressure of the formation. The term substantially chemically inert gaseous mixture or gas is understood to mean a gas or gaseous mixture which, under the operating conditions of the process, does not significantly react with the deposit fluids or the injected fluids. The gases can be nitrogen, natural gas, combustion gases of hydrocarbon compounds, a gas containing oxygen and which are used singly or in mixed form.

According to another feature of the process, the gas or gaseous mixture injected can contain a substantial molecular oxygen quantity between 0.001 and 50% and preferably between 0.1 and 30% by volume, based on the gaseous mixture. For example, it is possible to inject air, substantially at the pressure of the reservoir.

More particularly, the invention provides a process for consolidating a geological formation comprising the two following stages:

a) into the formation and substantially at the pressure thereof is injected the liquid mixture containing at least one polymerizable chemical compound to which has been added a catalyst, the mixture being able to undergo in situ reactions leading to the formation of a solid product, which consolidates said formation and b) the gas is injected in an appropriate way to substantially maintain the permeability of the formation until a substantially complete solidification of said liquid organic mixture has been obtained.

The injection of the gaseous mixture makes it possible to avoid a significant reduction of the permeability of the formation to fluids such as oil or natural gas. The gas flow rate is such that the gas to be injected floods the height to be treated. The liquid mixture used in the process according to the invention preferably contains a melamine-formaldehyde resin in aqueous solution, to which has been added at least one catalyst having a Lewis acid-type character.

The melamine-formaldehyde resins used can consist of condensation products in an alkaline medium of melamine and formaldehyde in proportions ranging e.g. between approximately 3 to 6 moles of formaldehyde per mole of melamine.

They are generally in the form of a powder, which can be readily dissolved in water. The water proportion can range between 10 and 50% and preferably 15 and 30% by weight resin.

The catalysts can be constituted by various compounds which are soluble in water and which have a Lewis acid charater, such as ammonium chloride or zinc chloride in aqueous solution or p-toluene sulphonic acid, tartaric acid, formic acid or oxalic acid used alone or in mixture. The nature and quantity of setting catalyst are in general terms chosen as a function of the temperature used and the setting times imposed. Due to the lower cost, preference is given to ammonium chloride in aqueous solution.

The setting catalyst proportion used can e.g. vary between 0.001 and 10% and preferably 0.05 and 5% by weight, based on the resin weight, whereby these proportions depend on the nature of the catalyst and the temperature of the formation.

The liquid mixture quantity injected will be a function of the volume of the formation which it is wished to consolidate. It is generally below 500 liters per meter of thickness of the geological formation, e.g. 30 to 500 l and preferably 100 to 300 l. However, higher quantities are not prejudicial to the efficiency of the inventive process.

In the application of the method to gas reservoirs, the chemically inert gas injected, as defined hereinbefore, is advantageously natural gas. In the application of the method to oil tanks, the injected gas is advantageously nitrogen, natural gas or the aforementioned combustion gases. The use or addition of air or oxygen-depleted air is also possible.

The gas injection time is preferably below 72 hours. However, longer times are not prejudicial to the efficiency of the inventive process.

The process is generally performed in the following way. An aqueous solution of melamine-formaldehyde resin is formed in the presence of a given quantity of catalyst. The volume of the formation, in the vicinity of the well which is intended to become a production well, normally imposes that the catalyst be introduced in a quantity such that the polymerization does not take place before a predetermined time has elapsed, taking account of the temperature and pressure of the formation and which is generally below 150° C., e.g. 50° to 120° C. and most frequently 70° to 100° C. The gas is injected substantially immediately afterwards at a rate adequate to invade or flood the entire volume of the layer in the vicinity of the well and for an adequate time to ensure that the advance of the polymerization reaction is such that the product is no longer mobile.

BRIEF DESCRIPTION OF THE DRAWING

FIG. 1 diagrammatically illustrates an embodiment of the invention.

DETAILED DESCRIPTION OF THE DRAWING

The reference 1 designates a sandy geological formation traversed by a well 2 which has a lining 3 provided with perforations 4 at the formation 1 from which it is wished to extract a fluid, such as oil or natural gas.

In the embodiment, the process according to the invention is performed by successively injecting into the formation 1 to be treated, predetermined quantities of the liquid mixture 5, such as an aqueous melamine-formaldehyde solution to which has been added a catalyst of the aforementioned type, as well as an inert gas 6, such as nitrogen in accordance with the above details.

The liquid mixture and the gas can be successively injected via a same production string or tubing 7 issuing, in its lower part, substantially level with the perforations 4.

A packer-type device 9 will ensure the necessary sealing by sealing the annular space between the lining 3 and the production string 7 above the formation 1. In the production string 7, the inert gas is separated from the liquid mixture by a plug 8 of a non-polymerizable substance, said plug being constituted e.g. by a small volume of water. This avoids reactions of the organic mixture within the production string.

Obviously the above embodiment is in no way limitative and other embodiments can also be envisaged.

In general terms, the liquid injected at 5 is a mixture which can be transformed, under the action of the temperature of the formation, into a polymer leading to the consolidation of said formation in the area surrounding the well.

In the case of oil deposits, it is advantageous for the injection of the liquid 5 to be preceded by the injection of fluids such as xylene or a petroleum fraction and an alcohol, such as isopropanol, in order to expel the oil and the water present in the area immediately surrounding the well and which, if present in excessive quantities could have a prejudicial effect on the efficiency of the consolidation of the medium. The gas quantity injected will be determined in such a way as to obtain a substantially complete solidification of the liquid 5.

The efficiency of the inventive process is illustrated by the following tests, the performance characteristics for the same having no limitative character.

TEST 1

An intimate mixture of quarry sand (grain size between 150 and 300 micrometers) and aqueous melamine-formaldehyde solution is compacted at ambient temperature in a diameter 5 cm, length 40 cm horizontal cell. The solid mass obtained by compacting 1392 g of sand and 348 g of aqueous melamine-formaldehyde resin solution * has a porosity of 40.5%, the temperature being maintained at 50° C.

* In the tests use was made of an aqueous solution containing 75% by weight of melamine-formaldehyde resin (Madurit MW 815 marketed by Hoechst).

A nitrogen flow of 1 liter/minute is injected at atmospheric pressure for 45 hours. At the end of the test it is observed that the solid mass is not consolidated.

Thus, under the chosen conditions no reaction occurs in the solid mass impregnated with the melamine-formaldehyde solution.

TEST 2

The same test as in Test 1 is carried out while adding to the melamine-formaldehyde solution a quantity of 7 g of catalyst, namely p-toluene sulphonic acid, i.e. 2.7% by weight of catalyst based on the resin. After 25 h operation, it can be seen that the solid mass is consolidated and its compression strength is 35 bar.

TEST 3

The same test as in Test 2 is performed, but doubling the catalyst quantity, i.e. 5.4%. After 3.4 h of test, it is found that the solid mass is consolidated and its compression strength is 44 bar.

TEST 4

A solid mass is constituted by mixing beforehand 1291 g of quarry sand and 329 g of aqueous solution of melamine-formaldehyde residue of example 1, to which has been added 26.5 g of an aqueous 2% by weight ammonium chloride solution, i.e. 0.2% catalyst based on the resin. Into the solid mass heated to 50° C. is injected nitrogen at atmospheric pressure and a flow rate of 1 l/min. for 48 h. The compression strength of the medium obtained after testing is 140 bar.

TEST 5

A test is carried out under the same conditions as Test 4 with a twice lower catalyst quantity, i.e. 0.1% catalyst and by injecting air at atmospheric pressure in place of nitrogen for 71 h. The compression strength of the medium after the test is 145 bar.

TEST 6

A solid mass identical to that of Test 4 is heated to a temperature of 75° C. Injection takes place of nitrogen at atmospheric pressure and at a rate of 0.7 l/min. for 22 h. After testing, the solid mass is consolidated and its compression strength is 140 bar.

TEST 7

A solid mass is formed by a mixture by weight of 66% quarry sand, 13% kaolinite and 21% of aqueous melamine-formaldehyde resin of example 1 containing 3.8% of an aqueous 2% by weight $NH_4Cl$ solution. Nitrogen is injected at a rate of 2 l/min. for 21 h into the solid mass heated to 75° C. After testing, the compression strength of the medium is 200 bar.

TEST 8

Into this solid mass, which is identical to that of Test 6, but which has a catalyst quantity of 0.05%, based on the resin, is injected nitrogen for a period of 41 h, the solid mass being heated to 75° C. After the test, the solid mass is well consolidated and its compression strength is 140 bar.

TEST 9

Into a solid mass constituted by 87.5% quarry sand, 3.5% kaolinite and 9% water is injected crude oil so as to saturate the free pore volume. After displacement of the fluids in place by petrol plugs and then isopropyl alcohol, injection takes place of a mixture constituted by a 99% aqueous melamine-formaldehyde resin solution of example 1 and 1% of an aqueous 2% by weight ammonium chloride solution, i.e. 0.027% catalyst, based on the resin.

The cell is heated at 100° C. under a pressure of 5 bar and the nitrogen is injected at a rate of 2.4 l/min. for 4 hours. Following the test, the medium has retained its permeability and is well consolidated. The compression strength is between 60 and 190 bar, according to samples taken at the end of the test.

We claim:

1. A process for consolidating a permeable geological formation without significantly reducing the permeability thereof, comprising:

injecting a polymerizable liquid mixture into the formation, said mixture containing an aqueous resin solution and at least one Lewis acid catalyst;

polymerizing said mixture at substantially the temperature and the pressure of the formation, into a solid substance bonding unconsolidated elements of the formation;

injecting at least one gas into said formation at least during the period of polymerization of said mixture, said gas being substantially chemically inert towards deposit and injected fluids under the operating conditions of the process, said injecting substantially maintaining the permeability of the formation.

2. Process according to claim 1, wherein the gas is natural gas, nitrogen, combustion gases of hydrocarbon compounds, a gas containing molecular oxygen or mixtures thereof.

3. Process according to claim 2, wherein the said gas contains molecular oxygen in a volume proportion of 0.001 to 50%.

4. Process according to claim 1, wherein the catalyst is ammonium chloride, p-toluene sulphonic acid, tartaric acid, formic acid, oxalic acid or mixtures thereof.

5. Process according to the claim 1, wherein the catalyst proportion is 0.001 to 10% by weight, based on the weight of the substance.

6. Process according to claim 1, wherein injection takes place through a well and under appropriate conditions of 30 to 500 liters of a liquid mixture per meter of thickness of the geological formation.

7. Process according to claim 1, wherein the catalyst is ammonium chloride or p-toluene sulphonic acid.

8. A process according to claim 1, wherein the aqueous resin solution is an aqueous melamine-formaldehyde resin solution.

9. A process according to claim 8, wherein the catalyst is ammonium chloride, p-toluene sulphonic acid, tartaric acid, formic acid, oxalic acid or mixtures thereof.

10. A process according to claim 9, wherein the catalyst proportion is 0.05 to 5% by weight, based on the weight of the substance.

11. A process according to claim 10, wherein the catalyst is ammonium chloride or p-toluene sulphonic acid.

12. A process according to claim 11, wherein the gas is natural gas, nitrogen, combustion gases of hydrocarbon compounds, a gas containing molecular oxygen or mixtures thereof.

13. A process according to claim 12, wherein the gas is air.

14. A process according to claim 9, wherein the catalyst proportion is 0.001 to 10% by weight, based on the weight of the substance.

15. A process according to claim 14, wherein the gas is natural gas, nitrogen, combustion gases of hydrocarbon compounds, a gas containing molecular oxygen or mixtures thereof.

16. Process according to claim 8, wherein the melamine-formaldehyde resin consists of the condensation products in alkaline medium of melamine and formaldehyde in proportions of 3 to 6 moles of formaldehyde per mole of melamine.

* * * * *